US011262447B2

(12) United States Patent
Inaba et al.

(10) Patent No.: US 11,262,447 B2
(45) Date of Patent: Mar. 1, 2022

(54) FLYING BODY AND PROGRAM

(71) Applicant: Japan Aerospace Exploration Agency, Tokyo (JP)

(72) Inventors: Noriyasu Inaba, Tokyo (JP); Satoru Ozawa, Tokyo (JP); Yohei Sugimoto, Tokyo (JP)

(73) Assignee: JAPAN AEROSPACE EXPLORATION AGENCY

( * ) Notice: Subject to any disclaimer, the term of this patent is extended or adjusted under 35 U.S.C. 154(b) by 173 days.

(21) Appl. No.: 16/487,314

(22) PCT Filed: Feb. 26, 2018

(86) PCT No.: PCT/JP2018/006941
§ 371 (c)(1),
(2) Date: Aug. 20, 2019

(87) PCT Pub. No.: WO2018/155683
PCT Pub. Date: Aug. 30, 2018

(65) Prior Publication Data
US 2020/0025912 A1    Jan. 23, 2020

(30) Foreign Application Priority Data
Feb. 24, 2017    (JP) .............................. JP2017-034122

(51) Int. Cl.
*G01S 13/90*    (2006.01)
*G01S 13/00*    (2006.01)

(52) U.S. Cl.
CPC .......... *G01S 13/9029* (2013.01); *G01S 13/90* (2013.01); *G01S 13/9027* (2019.05)

(58) Field of Classification Search
CPC .. G01S 13/9029; G01S 13/90; G01S 13/9027; G01S 13/9023; G01S 13/9092; G06T 7/32
See application file for complete search history.

(56) References Cited

U.S. PATENT DOCUMENTS 4,546,354 A * 10/1985 Boles .................. G01S 13/9092
342/179
4,546,355 A * 10/1985 Boles .................. G01S 13/9092
342/179

(Continued)

FOREIGN PATENT DOCUMENTS

JP    2001-004398 A    1/2001
JP    2004-170170 A    6/2004

(Continued)

OTHER PUBLICATIONS

International Search Report dated May 29, 2018 in corresponding PCT International Application No. PCT/JP2018/006941.

(Continued)

*Primary Examiner* — Bernarr E Gregory
(74) *Attorney, Agent, or Firm* — Ostrolenk Faber LLP

(57) ABSTRACT

A flying body includes an observation data generation unit that generates observation data on the basis of radio waves received by a radar, an image generation unit that generates an image representing a monitoring space on the basis of the observation data generated by the observation data generation unit, and a detection unit that detects a detection target on the basis of the image generated by the image generation unit.

8 Claims, 8 Drawing Sheets

(56) References Cited

U.S. PATENT DOCUMENTS

| | | | |
|---|---|---|---|
| 4,563,686 A * | 1/1986 | Boles | G01S 13/90 342/250 C |
| 4,723,124 A * | 2/1988 | Boles | G01S 13/9023 342/250 C |
| 5,248,979 A | 9/1993 | Orme et al. | 342/58 |
| 9,684,071 B2 * | 6/2017 | Wishart | G01S 13/90 |
| 2007/0146195 A1 * | 6/2007 | Wallenberg | G01S 13/78 342/52 |
| 2008/0158256 A1 * | 7/2008 | Russell | G06T 7/32 345/629 |
| 2009/0256741 A1 | 10/2009 | Shibayama et al. | 342/352 |
| 2015/0054678 A1 | 2/2015 | Wakayama | 342/25 A |

FOREIGN PATENT DOCUMENTS

| | | |
|---|---|---|
| JP | 2010-197337 A | 9/2010 |
| JP | 2011-208961 A | 10/2011 |
| JP | 2012-063196 A | 3/2012 |
| JP | 2012-242216 A | 12/2012 |
| JP | 2014-510913 A | 5/2014 |
| WO | WO 2008/016153 A1 | 2/2008 |
| WO | WO2009/080903 A1 * | 7/2009 ............. G01S 17/06 |
| WO | WO 2012/120137 A1 | 9/2012 |
| WO | WO 2014/010000 A1 | 1/2014 |
| WO | WO2016/101279 A1 * | 6/2016 ............. G06T 11/00 |
| WO | WO 2016/167017 A1 | 10/2016 |
| WO | WO2017/060543 A1 * | 4/2017 ............. G01S 13/78 |

OTHER PUBLICATIONS

Written Opinion dated May 29, 2018 in corresponding PCT International Application No. PCT/JP2018/006941.

Vesselfinder powered by HuygensWorks, 2014, url address: http://www.mss.co.jp/information/20141205/VesselFinder2.pdf, (with partial translation).

S. Lehner et al., "Maritime Products Using Terrasar-X and Sentinel-1 Imagery," The International Archives of the Photogrammetry, Remote Sensing and Spatial Information Sciences, vol. XL-7/W3, 2015, pp. 967-973.

Japanese Office Action, dated Jan. 4, 2022, issued in corresponding Japanese Patent Application No. 2019-501862. Includes English translation. Total 15 pages.

* cited by examiner

TO SYNTHETIC APERTURE RADAR UNIT,
COMMUNICATION ANTENNA UNIT, AND THE LIKE

FLYING BODY AND PROGRAM

CROSS-REFERENCE TO RELATED APPLICATIONS

The present application is a 35 U.S.C. §§ 371 national phase conversion of PCT/JP2018/006941, filed Feb. 26, 2018, which claims priority to Japanese Patent Application No. 2017-034122, filed Feb. 24, 2017, the contents of which are incorporated herein by reference. The PCT International Application was published in the Japanese language.

TECHNICAL FIELD

This invention relates to a flying body and a program.

BACKGROUND ART

Research and development of techniques relating to artificial satellites that transmit and receive radio waves to and from an observation target has been performed. Such an artificial satellite, for example, generates observation data representing an observation target on the basis of radio waves received from the observation target, and transmits the generated observation data toward a reception device on the ground. The reception device performs processing based on the received observation data.

In this connection, an artificial satellite that frequency-demultiplexes observation data into a plurality of channels and executes compression using hardware with respect to each of the plurality of channels is known (see Patent Literature 1). In addition, a technique for generating an image representing an observation target on the basis of the observation data received from an artificial satellite by the reception device is known. In addition, software for detecting a vessel in a sea area included in an observation target on the basis of the image is known (see Non-Patent Literature 1 and Non-Patent Literature 2).

CITATION LIST

Patent Literature

[Patent Literature 1]
PCT Japanese Translation Patent Publication No. 2014-510913

Non-Patent Literature

[Non-Patent Literature 1]
VESSELFINDER powered by HuygensWorks: www.mss.co.jp/information/20141205/VesselFinder2.pdf
[Non-Patent Literature 2]
MARITIME PRODUCTS USING TERRASAR-X and SENTINEL-1 IMAGERY: S. Lehner, B. Tings, The International Archives of the Photogrammetry, Remote Sensing and Spatial Information Sciences, Volume XL-7/W3, 2015

SUMMARY OF INVENTION

Technical Problem

In artificial satellites of the related art, an amount of observation data can be compressed, but even observation data that is not involved with an observation target is transmitted to a ground station. This may prolong a time required for data transmission (a time inclusive of a time of downlink from a satellite, a standby time in a ground station buffer storage, a transmission time from the buffer storage to a data processing center, or the like). As a result, in artificial satellites of the related art, there is the possibility of an observation target not being able to be discovered rapidly. In addition, in software of the related art, since a vessel in a sea area included in an observation target is detected on the basis of an image representing the observation target, there is the possibility of a difference between a time at which the vessel is observed by an artificial satellite and a time at which the vessel is detected by the software being approximately several tens of hours to several days. As a result, there is the possibility of a vessel in a desired sea area desired to be monitored by a user not being able to be detected at a desired timing at which it is desired to be detected by the user.

The present invention provides a flying body and a program that, when data is transmitted to a ground station side, make it possible to make the amount of data to be transmitted smaller than the amount of observation data, and to notify a user earlier that a desired detection target has been detected.

Solution to Problem

According to an aspect of the present invention, there is provided a flying body including: an observation data generation unit that generates observation data on the basis of radio waves received by a radar; an image generation unit that generates an image representing a monitoring space on the basis of the observation data generated by the observation data generation unit; and a detection unit that detects a detection target on the basis of the image generated by the image generation unit.

According to another aspect of the present invention, there is provided a flying body including: an observation data generation unit that generates observation data on the basis of radio waves received by a radar; a processing unit that performs range compression on the observation data generated by the observation data generation unit; and a detection unit that detects a detection target on the basis of a signal on which range compression is performed by the processing unit.

In the flying body according to another aspect of the present invention, a configuration may be used in which the monitoring space includes a sea area, and the detection target includes a vessel in the sea area.

In the flying body according to another aspect of the present invention, a configuration may be used in which the detection unit detects a target estimated to be the detection target, as the detection target, from candidates for the detection target in the monitoring space on the basis of a plurality of parameters stored in advance.

In the flying body according to another aspect of the present invention, a configuration may be used in which the detection unit detects the detection target by comparing a base map with an image generated by the image generation unit.

In the flying body according to another aspect of the present invention, a configuration may be used in which the detection target includes a crustal movement in the monitoring space.

In the flying body according to another aspect of the present invention, a configuration may be used in which a position calculation unit that calculates a position of the detection target detected by the detection unit and generates position information indicating the calculated position is further included.

In the flying body according to another aspect of the present invention, a configuration may be used in which a feature extraction unit that extracts a feature of the detection target detected by the detection unit is further included.

According to another aspect of the present invention, there is provided a program causing a computer included in a flying body to generate observation data based on radio waves received by a radar, generate an image representing a monitoring space on the basis of the generated observation data, and detect a detection target in the generated image.

According to another aspect of the present invention, there is provided a program causing a computer included in a flying body to generate observation data based on radio waves received by a radar, perform range compression on the generated observation data, and detect a detection target on the basis of a signal on which range compression is performed.

Advantageous Effects of Invention

According to the flying body and the program described above, when data is transmitted to a ground station side, it is possible to make the amount of data to be transmitted smaller than the amount of observation data. This makes it possible to notify a user earlier that a desired detection target has been detected.

DESCRIPTION OF EMBODIMENTS

Embodiment

Hereinafter, an embodiment of the present invention will be described with reference to the accompanying drawings.

<Outline of Satellite Observation System>

Figure 1:
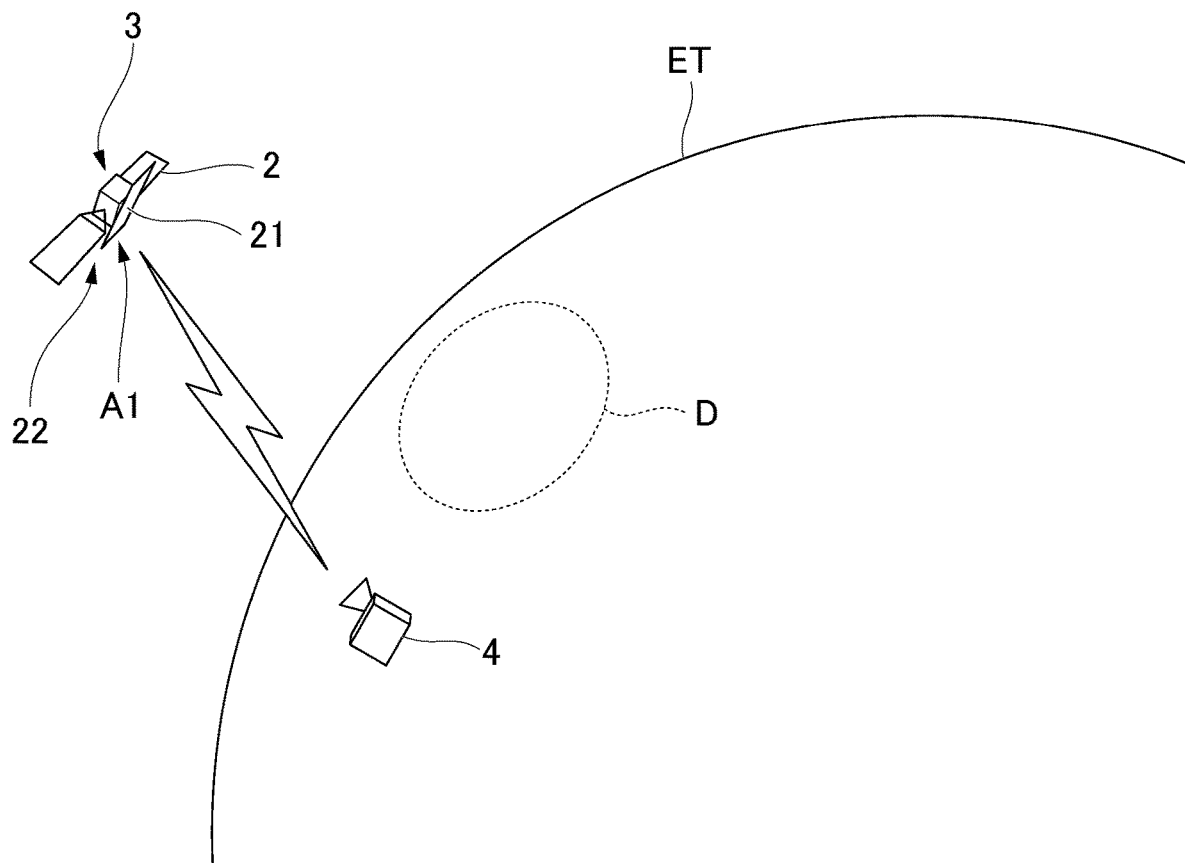
FIG. 1 is a diagram illustrating an example of a configuration of a satellite observation system 1.

First, the outline of a satellite observation system 1 according to an embodiment will be described. FIG. 1 is a diagram illustrating an example of a configuration of the satellite observation system 1.

The satellite observation system 1 includes a flying body 2 and a reception device 4.

In the present embodiment, the flying body 2 is an artificial satellite revolving around in the sky above the surface of the earth ET along a predetermined orbit. Meanwhile, the flying body 2 may be an artificial satellite revolving around in the sky above the surface of another celestial body or an object, instead of the sky above the surface of the earth ET, along the orbit. Examples of the celestial body include other planets, such as Mars or Venus, which are different from the earth ET, satellites such as the moon or Titan, asteroids such as Itokawa, and the like. In addition, examples of the object include a rock and the like. In addition, the flying body 2 may be other flying bodies such as an airplane or a drone, instead of an artificial satellite.

In the present embodiment, the flying body 2 observes a region D which is a portion of regions included in the surface of the earth ET as an observation target which is a desired target desired to be observed. That is, the flying body 2 radiates (transmits) radio waves toward the region D. The observation target is, in other words, a monitoring space in which the flying body 2 monitors. The monitoring space (that is, the observation target) may be a two-dimensional plane like the region D in this example, or may be a three-dimensional space instead of the two-dimensional plane.

Meanwhile, the flying body 2 may be configured to observe other objects exists on the earth ET as observation targets instead of being configured to observe a portion of the region as an observation target. When the flying body 2 passes through the sky in which radio waves can be radiated into the region D in the sky above the surface, the flying body has the posture thereof controlled so that radio waves radiated from the flying body 2 are radiated into the region D. Hereinafter, a control method for the posture of the flying body 2 to be used may be a known control method, or may be a method which can be developed in the future, and thus will not be described. The flying body 2 observes the region D by receiving radio waves which are radiated into the region D and then are reflected from the surface of the region D.

More specifically, the flying body 2 includes a synthetic aperture radar unit 21, a communication antenna unit 22, and a control device 3. The flying body 2 is an example of a flying body.

The synthetic aperture radar unit 21 is provided with a plurality of antenna elements arranged in a first direction as a phased array antenna A1. In the following description, the phased array antenna A1 has a function of both transmission and reception. However, the phased array antenna A1 may have a transmission antenna and a reception antenna configured separately from each other. The phased array antenna A1 is provided at a predetermined position on the synthetic aperture radar unit 21. The position is a position at which radio waves can be radiated (transmitted) from the phased array antenna A1 toward a second direction. The radio waves are radio waves according to a signal acquired from the control device 3 by the synthetic aperture radar unit 21. The second direction is a direction perpendicular to the first direction. When the flying body 2 passes through the sky in which radio waves can be radiated into the region D in the sky above the surface of the earth ET, the second direction coincides with a direction toward the region D. Hereinafter, as an example, a case in which the first direction is an azimuth direction will be described. The azimuth direction is the traveling direction of the flying body 2. That is, the second direction in this example is a range (slant range in a side-looking mode) direction. In addition, the phased array antenna A1 receives radio waves that arrive toward the phased array antenna A1. Meanwhile, the first direction may be other directions instead of the azimuth direction. That is, the second direction may be other directions instead of a range direction. In addition, the synthetic aperture radar unit 21 may be configured to include other antennas such as a slot antenna or a parabolic antenna instead of the phased array antenna A1. In addition, in a same manner with the phased array antenna A1 in the present embodiment, an antenna included in the synthetic aperture radar unit 21 may have a transmission antenna and a reception antenna configured separately from each other. In this case, the flying body 2 may include only the reception antenna, and configures a tandem satellite with a satellite including the transmission antenna.

The communication antenna unit 22 includes an antenna that transmits and receives radio waves according to various types of information to and from the reception device 4. The antenna is not particularly limited, and may be a parabolic antenna, or may be a phased array antenna.

The control device 3 controls the entirety of the flying body 2. In the present embodiment, the control device 3 is built into the flying body 2. Meanwhile, the control device 3 may be configured separately from the flying body 2. In this case, for example, the control device 3 is included in another artificial satellite, and controls the flying body 2 from the artificial satellite through wireless communication.

The control device 3 outputs a transmission pulse signal to the synthetic aperture radar unit 21 at a pulse repetition frequency (PRI) interval within a synthetic aperture time (that is, one cycle). Thereby, the control device 3 causes the phased array antenna A1 to radiate (transmit) radio waves according to the transmission pulse signal, as radiation radio waves, toward the region D. The transmission pulse signal is a chirp signal, and is a signal having the frequency thereof changing with the elapse of time. In the present embodiment, the frequency band of the transmission pulse signal is the microwave frequency band. Meanwhile, the frequency band of the transmission pulse signal may be a frequency band lower than the microwave frequency band instead of the microwave frequency band, or may be a frequency band higher than the microwave frequency band.

Here, a part of the radiation radio waves radiated from the phased array antenna A1 are reflected toward the phased array antenna A1 by a virtual point-like backscattering body located at each position on the surface of the region D. The control device 3 receives the radio waves reflected in this manner by the phased array antenna A1. For this reason, in the following description, the point-like backscattering body located at each position is referred to as a backscattering body for convenience of description.

The control device 3 generates observation data based on the intensity of radio waves received by the phased array antenna A1 and a time at which the radio waves are received. The observation data is two-dimensional data having a cell representing a time at which radio waves are received by the phased array antenna A1. The intensity of radio waves received by the phased array antenna A1 at a time represented by each cell is associated with each cell of observation data. A method in which the control device 3 generates observation data may be a known method, or may be a method which can be developed in the future. For this reason, hereinafter, the method will not be described in more detail (for example, processing such as denoising or the like will not be described).

Here, a control device X different from the control device 3 (for example, a control device of the related art) outputs generated observation data to the communication antenna unit 22, and causes the communication antenna unit 22 to transmit radio waves according to the observation data toward a reception device installed on the surface of the earth ET. Thereby, in accordance with a request from a user, the reception device can transmit the observation data received from the control device X to a device corresponding to the request at a timing corresponding to the request. However, the timing is often not able to be determined according to a certain user's convenience. In addition, a time required for the transmission of observation data from the control device X to the reception device becomes longer as the amount of the observation data increases. Due to such circumstances, a satellite observation system including the control device X may not detect a detection target in the region D at a timing desired by a user. Here, the user is, for example, a person who operates the device concerned on the ground. Meanwhile, the user may be another person instead of the person concerned.

Consequently, the control device 3 detects a detection target in the region D (that is, the observation target) on the basis of the generated observation data. That is, the flying body 2 itself detects a detection target in the region D on the basis of the observation data. Thereby, the flying body 2 can make the amount of data to be transmitted to a target to which data is transmitted (the reception device 4 in this example) smaller than the amount of the observation data. In addition, the flying body 2 can reduce the size of a storage capacity required for storing the data. Thereby, the flying body 2 can notify a user earlier that a desired detection target has been detected. In addition, regarding the observation of an area in which direct transmission to a ground station is possible, transmission data may be sent directly to a communication unit without being stored in a storage unit. The control device 3 detects a detection target, and then generates transmission data including information indicating a result of the detection target having been detected. The control device 3 outputs the generated transmission data to the communication antenna unit 22, and causes the communication antenna unit 22 to transmit the transmission data toward the reception device 4. The control device 3 receives radio waves according to various control signals from the reception device 4 through the communication antenna unit 22. The control device 3 performs processing according to the received radio waves.

The reception device 4 includes an antenna capable of transmitting and receiving various types of information to and from the flying body 2 through radio waves. The reception device 4 is, for example, a dedicated or general-purpose computer to which the antenna is connected. The reception device 4 is installed at a position desired by a user on the surface of the earth ET.

The reception device 4 receives the transmission data transmitted toward the reception device 4 by the flying body 2 as received data. The reception device 4 stores the received data. Thereby, a user can perform work according to information indicating a detection target included in the received data stored by the reception device 4.

Hereinafter, the functional configuration of the control device 3 and a process in which the control device 3 detects a detection target in the region D on the basis of observation data will be described in detail.

<Hardware Configuration of Control Device>

Figure 2:
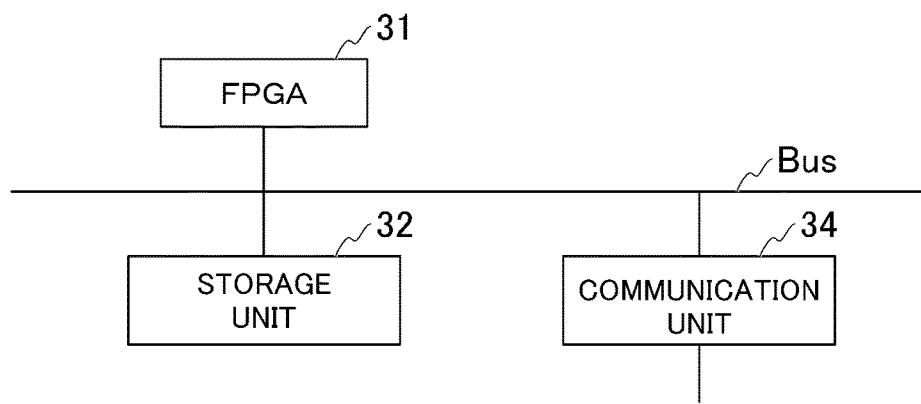
FIG. 2 is a diagram illustrating an example of a hardware configuration of a control device 3.

Hereinafter, the hardware configuration of the control device 3 will be described with reference to FIG. 2. FIG. 2 is a diagram illustrating an example of the hardware configuration of the control device 3.

The control device 3 includes, for example, a field programmable gate array (FPGA) 31, a storage unit 32, and a communication unit 34. These components are communicably connected to each other through a bus Bus. In addition, the control device 3 communicates with the synthetic aperture radar unit 21 and the communication antenna unit 22 through the communication unit 34. Meanwhile, the control device 3 may be configured to include a central processing unit (CPU) instead of the FPGA 31.

The FPGA 31 realizes the functional configuration of the control device 3 to be described later through a hardware functional unit.

The storage unit 32 includes, for example, an electrically erasable programmable read-only memory (EEPROM), a read-only memory (ROM), a random access memory (RAM), a flash memory, or the like. The storage unit 32 stores various types of information, various types of images, or the like in which the control device 3 processes.

The communication unit 34 is configured to include, for example, an analog or digital input and output port or the like according to various communication standards.

<Functional Configuration of Control Device>

Figure 3:
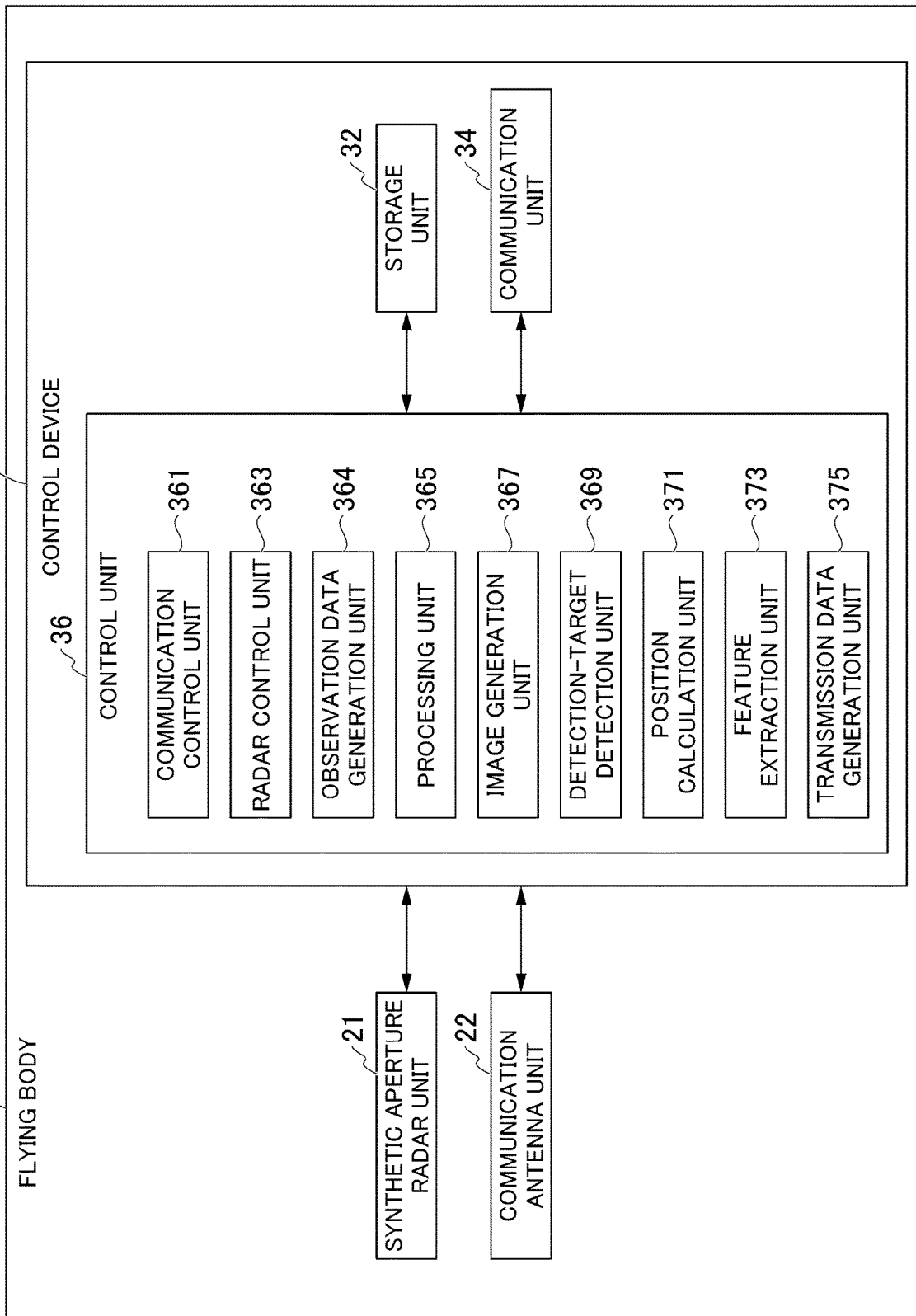
FIG. 3 is a diagram illustrating an example of a functional configuration of the control device 3.

Hereinafter, the functional configuration of the control device 3 will be described with reference to FIG. 3. FIG. 3 is a diagram illustrating an example of the functional configuration of the control device 3.

The control device 3 includes the storage unit 32, the communication unit 34, and a control unit 36.

The control unit 36 controls the entirety of the control device 3. The control unit 36 includes a communication control unit 361, a radar control unit 363, an observation data generation unit 364, a processing unit 365, an image generation unit 367, a detection-target detection unit 369, a position calculation unit 371, a feature extraction unit 373, and a transmission data generation unit 375. Some or all of these functional units included in the control unit 36 may be hardware functional units such as a large scale integration (LSI) or an application specific integrated circuit (ASIC).

The communication control unit 361 transmits and receives radio waves corresponding to various types of information to and from the reception device 4 through the communication antenna unit 22. Specifically, for example, the communication control unit 361 receives radio waves corresponding to control signals from the reception device 4 through the communication antenna unit 22. In addition, the communication control unit 361 causes the communication antenna unit 22 to transmit radio waves corresponding to transmission data generated by the transmission data generation unit 375 toward the reception device 4.

The radar control unit 363 outputs a transmission pulse signal to the synthetic aperture radar unit 21 at a PRI interval within a synthetic aperture time (that is, one cycle). The radar control unit 363 causes the phased array antenna A1 of the synthetic aperture radar unit 21 to radiate (transmit) radiation radio waves corresponding to the transmission pulse signal toward the region D. In addition, the radar control unit 363 receives a part of the radiation radio waves radiated from the phased array antenna A1, that is, radio waves reflected from each backscattering body through the phased array antenna A1.

The observation data generation unit 364 generates the aforementioned observation data on the basis of the radio waves received by the phased array antenna A1 of the synthetic aperture radar unit 21.

The processing unit 365 performs various types of processing on the observation data generated by the observation data generation unit 364.

The image generation unit 367 generates an image representing the region D (that is, the observation target) on the basis of the observation data generated by the processing unit 365.

The detection-target detection unit 369 detects a detection target in the region D on the basis of the observation data generated by the observation data generation unit 364.

The position calculation unit 371 calculates the position of the detection target detected by the detection-target detection unit 369 on the basis of the observation data generated by the observation data generation unit 364.

The feature extraction unit 373 extracts the feature of the detection target detected by the detection-target detection unit 369 on the basis of the observation data generated by the observation data generation unit 364.

The transmission data generation unit 375 generates information including some or all of information including an image generated by the image generation unit 367, position information indicating the position calculated by the position calculation unit 371, and feature information indicating the feature detected by the feature extraction unit 373 as transmission data.

<Process in Which Control Device Detects Detection Target in Observation Target on the Basis of Observation Data>

Figure 4:
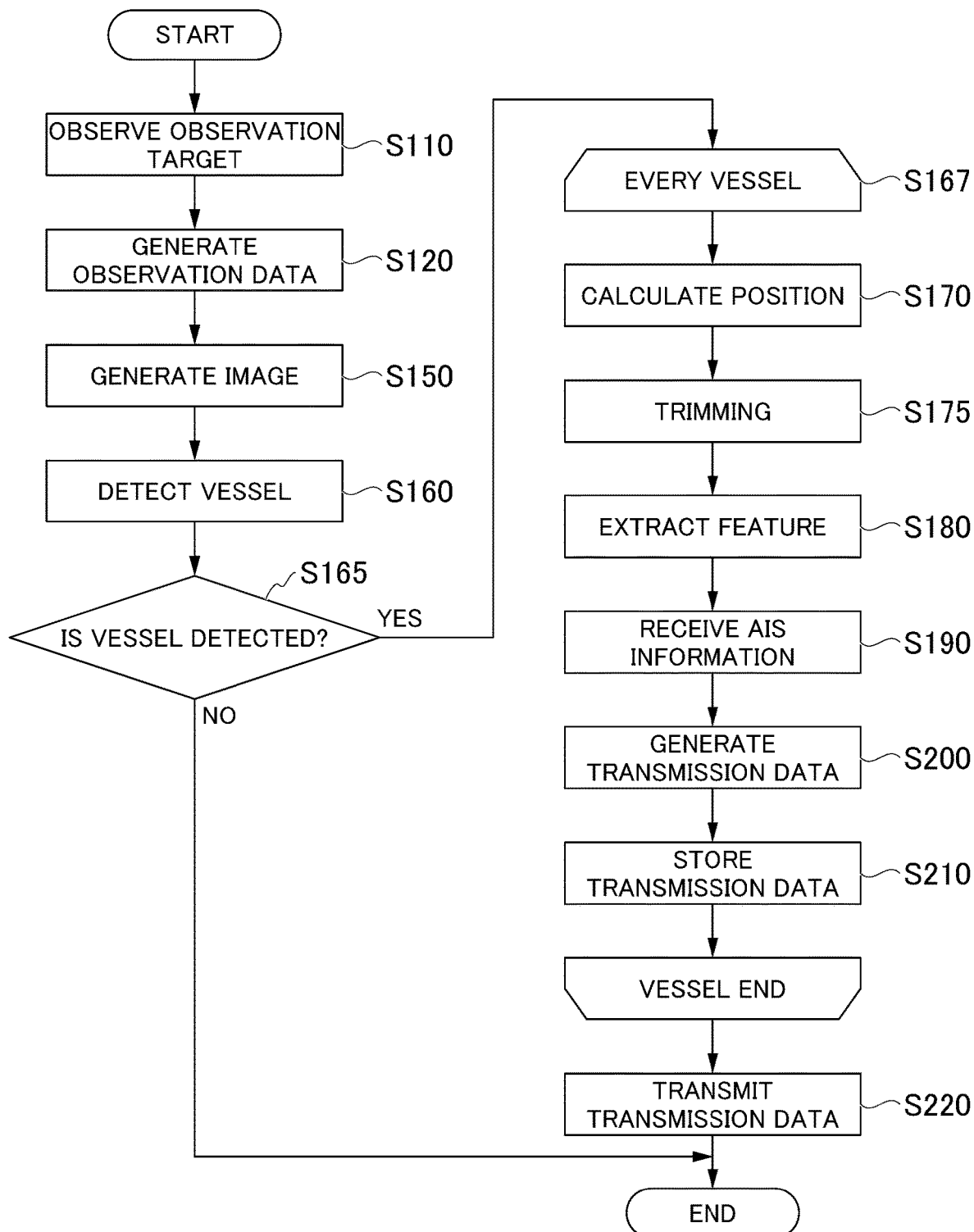
FIG. 4 is a flow chart illustrating an example of a flow of processes in which the control device 3 detects a vessel included in a region D on the basis of observation data.

Hereinafter, a process in which the control device 3 detects a detection target in the region D on the basis of the observation data will be described with reference to FIG. 4. Hereinafter, as an example, a process in which the control device 3 detects a vessel in the region D as a detection target on the basis of the observation data will be described. In this case, the region D includes at least a sea area in a region included in the surface of the earth ET. FIG. 4 is a flow chart illustrating an example of a flow of processes in which the control device 3 detects a vessel in the region D (that is, a vessel in the sea area) on the basis of the observation data. Meanwhile, the detection target may be configured to include other objects or phenomena in addition to a vessel.

In a case where the position of the flying body 2 is a position at which radiation radio waves can be radiated from the synthetic aperture radar unit 21 to at least a portion of the region D, the radar control unit 363 controls the synthetic aperture radar unit 21, such that the region D is observed (step S110). Specifically, in the case, the radar control unit 363 outputs a transmission pulse signal to the synthetic aperture radar unit 21 at a PRI interval within a synthetic aperture time (that is, one cycle). The radar control unit 363 causes the phased array antenna A1 of the synthetic aperture radar unit 21 to radiate (transmit) radiation radio waves corresponding to the transmission pulse signal toward the region D. In a case where the position of the flying body 2 moves to a position at which radiation radio waves cannot be radiated from the synthetic aperture radar unit 21 to at least a portion of the region D, the radar control unit 363 stops outputting a transmission pulse signal to the synthetic aperture radar unit 21. In addition, the radar control unit 363 receives a part of the radiation radio waves radiated from the phased array antenna A1, that is, radio waves reflected from each backscattering body through the phased array antenna A1. The radar control unit 363 performs processing such as A/D conversion on received radio waves information indicating the received radio waves. Meanwhile, in the present embodiment, the processing will not be described. In this manner, the radar control unit 363 observes the region D through the synthetic aperture radar unit 21.

Next, the observation data generation unit 364 generates observation data on the basis of the received radio waves information indicating the radio waves received in step S110 (step S120). Here, the observation data generation unit 364 may be configured to generate the observation data in step S120, and then store the generated observation data in the storage unit 32, or the observation data generation unit 364 may be configured may be configured not to store the observation data in the storage unit 32.

Next, the image generation unit 367 generates an image representing the region D on the basis of the observation data generated in step S120 (step S150). Specifically, the image generation unit 367 performs compression in a range direction and compression in an azimuth direction on the observation data, and generates the compressed data as an image representing the region D. Here, the position of each pixel of the image generated by the image generation unit 367 represents a position on the image of the aforementioned backscattering body, and the pixel value of each pixel represents the luminance value of radio waves reflected from the backscattering body. In addition, phase information indicating the phase of radio waves that arrive from the backscattering body represented by each pixel toward the phased array antenna A1 is associated with each pixel of the image. The image generation unit 367 generates an image representing the region D using, for example, a range-Doppler method, a chirp scaling method, an omega kappa method, or the like. In this case, the image generation unit 367 may improve the accuracy of calculation of the phase by performing a high-precision orbit determination process and ionospheric delay correction. In addition, the image generation unit 367 may be configured to perform processing of removing a phase component caused by an altitude on the surface of the region D using a digital elevation model stored in the storage unit 32 in advance. In this case, the image generation unit 367 reads out the digital elevation model from the storage unit 32. Here, the digital elevation model is a three-dimensional model representing at least a portion of the shape of the surface of the earth ET. Meanwhile, the image generation unit 367 may be configured to generate the image from the observation data using a known method different from these methods, or may be configured to generate the image from the observation data using a method which can be developed in the future. For this reason, a method of generating the image which is performed by the image generation unit 367 will not be described in more detail.

Next, the detection-target detection unit 369 detects an object considered (estimated) to be a vessel included in the image as a vessel on the basis of the image generated by the image generation unit 367 in step S150 (step S160). Meanwhile, the object considered (estimated) to a vessel included in the image may include an object such as a maritime structure or an islet in addition to a real vessel. Here, the process of step S160 will be described. For example, the detection-target detection unit 369 reads out land area information indicating a land area which is a region different from a sea area in a region included in the region D from the storage unit 32. The land area is a terrestrial region in a region included in the region D. The detection-target detection unit 369 applies a land area filter to the image on the basis of the read-out land area information. Specifically, in the image, the detection-target detection unit 369 changes the luminance value of pixels included in a portion of the land area indicated by the land area information to a predetermined first luminance value. The first luminance value is, for example, 0. Meanwhile, the first luminance value may be any luminance value instead of 0 in a case where it is a luminance value that makes it possible for the detection-target detection unit 369 to differentiate a difference in luminance value from a third luminance value to be described later. In the following description, an image after a land area filter is applied to the image is referred to as a land area removed image for convenience of description.

After the land area removed image is generated, the detection-target detection unit 369 applies a binarization filter to the land area removed image. Specifically, the detection-target detection unit 369 sets the luminance value of a pixel of which the luminance value is less than a predetermined luminance value among a plurality of pixels constituting the land area removed image to a second luminance value, and sets the luminance value of a pixel of which the luminance value is equal to or greater than a first predetermined luminance value among a plurality of pixels constituting the land area removed image to a predetermined third luminance value, to thereby binarize the land area removed image. The second luminance value is, for example, 0. Meanwhile, the second luminance value may be any luminance value instead of 0 in a case where it is a luminance value that makes it possible for the detection-target detection unit 369 to differentiate a difference in luminance value from a third luminance value to be described later. The third luminance value is, for example, 255. Meanwhile, the third luminance value may be any luminance value instead of 255 in a case where it is a luminance value that makes it possible for the detection-target detection unit 369 to differentiate a difference in luminance value from both the first luminance value and the second luminance value. The first predetermined luminance value may be any luminance value in a case where it is a luminance value that is greater than the first luminance value and the second luminance value and smaller than the third luminance value.

Figure 5:
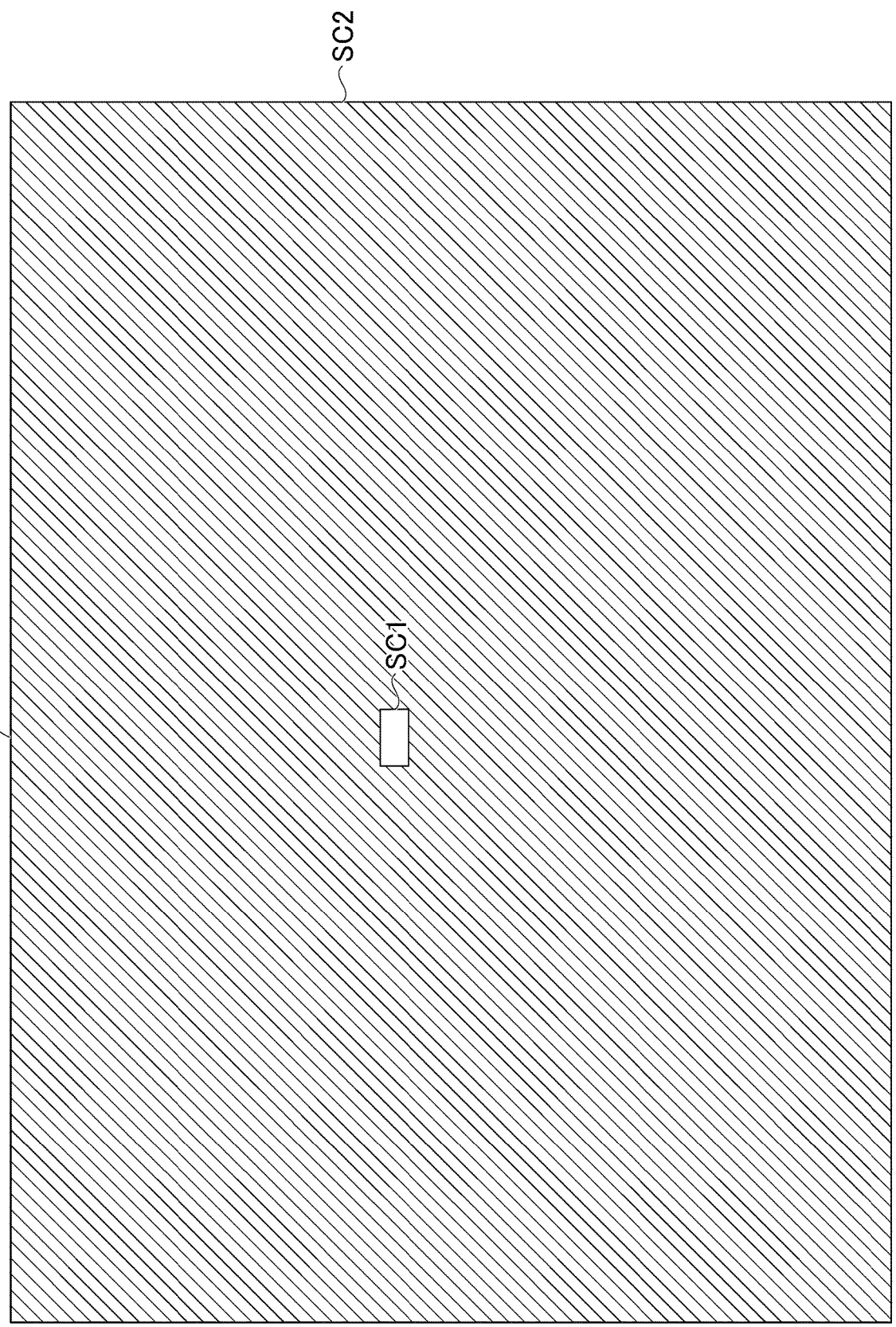
FIG. 5 is a diagram illustrating an example of a binarized image, and an image P1 shown in FIG. 5 is an example of a binarized image.

In the following description, the image after a binarization filter is applied to the land area removed image is referred to as a binarized image for convenience of description. FIG. 5 is a diagram illustrating an example of a binarized image. An image P1 shown in FIG. 5 is an example of the binarized image. In the image P1, a region SC1 represents a region constituted by a pixel of which the luminance value is the third luminance value. In addition, a region SC2 that is a hatched region represents a region constituted by a pixel of which the luminance value is the second luminance value. In addition, the detection-target detection unit 369 may be configured to binarize the land area removed image using a standard deviation filter instead of the binarization filter.

In a case where one or more regions are included in the binarized image, wherein the one or more regions are constituted by a predetermined number or more of pixels which have the luminance value it the third luminance value, the detection-target detection unit 369 detects each of the regions (that is, regions corresponding to the object considered to be the aforementioned vessel) as a vessel. The predetermined number is, for example, 10. Meanwhile, the predetermined number may be a number smaller than 10, or may be a number greater than 10. Here, the region SC1 shown in FIG. 5 is an example of a region constituted by a predetermined number of pixels of which the luminance value is the third luminance value. That is, in the example shown in FIG. 5, the detection-target detection unit 369 detects the region SC1 as a vessel.

Meanwhile, the detection-target detection unit 369 in step S160 may be configured to detect a vessel in the image generated in step S150 using a machine learning algorithm without applying at least a portion of the land area filter, the binarization filter and the standard deviation filter to the image. In this case, information in which a plurality of images having a vessel included therein and the position and shape of the vessel in each of the images are associated with each other, a plurality of images in which a vessel is not included, and information indicating that a vessel is not included in each of the images are stored (learned) in the detection-target detection unit 369 in advance as a plurality of parameters. Here, each of the images is a vessel image obtained by clipping an image of one scene. The detection-target detection unit 369 detects a candidate likely to be a vessel, as a vessel, from candidates for the vessel included in the image generated in step S150 on the basis of a plurality of parameters stored in advance. In addition, in the case, the detection-target detection unit 369 may be configured to detect the likely candidate as a vessel using the algorithm in step S160, and to perform a process of step S180 to be described later (specifically, extraction of the feature of the vessel detected in step S160). Here, the algorithm may be any known algorithm (including deep learning), or may be an algorithm which can be developed in the future.

For this reason, the machine learning algorithm will not be described in more detail.

After the process of step S160 is performed, the detection-target detection unit 369 determines whether a vessel has been detected in step S160 (step S165). In a case where the detection-target detection unit 369 determines that a vessel has not been detected in step S160 (step S165—NO), the control unit 36 ends the process. On the other hand, in a case where the detection-target detection unit 369 determines that a vessel has been detected in step S160 (step S165—YES), the image generation unit 367, the position calculation unit 371, the feature extraction unit 373, the communication control unit 361, and the transmission data generation unit 375 each repeatedly perform processes of steps S170 to S210 for each of one or more vessels detected in step S160 (step S167). In the following description, the vessel selected in step S167 is referred to as a target vessel for convenience of description.

After the target vessel is selected in step S167, the position calculation unit 371 calculates the position of the target vessel (step S170). Specifically, the position calculation unit 371 calculates a latitude and longitude represented by a predetermined position of a region detected as the target vessel in a region included in the binarized image in step S160 as the position of the target vessel. In this case, the position calculation unit 371 acquires flying body position information indicating the position of the flying body 2 at each time (for example, global positioning system (GPS) information) and flying body posture information indicating the posture of the flying body 2 at each time (for example, attitude control system (ACS) information), and calculates a latitude and longitude represented by the predetermined position as the position of the target vessel on the basis of the flying body position information and the flying body posture information which are acquired. The predetermined position is, for example, the position of the center of figure (or centroid) of the region. Meanwhile, the predetermined position may be other positions based on the region instead of the position of the center of figure of the region.

Next, the image generation unit 367 trims the image generated in step S150 on the basis of the position of the target vessel calculated in step S170 (step S175). Specifically, the image generation unit 367 trims (clips) a partial image representing a region of a predetermined shape centering on the position of the target vessel calculated in step S170 in a region included in the region D from the image. The predetermined shape is, for example, a predetermined distance-square rectangle. In addition, the predetermined shape is a rectangular region having a side parallel to the latitude direction and a side parallel to the longitude direction in the image. The predetermined distance is, for example, 500 meters. Meanwhile, the predetermined distance may be a distance smaller than 500 meters, or may be a distance greater than 500 meters. In addition, the predetermined shape may be other shapes such as a circle or an ellipse instead of the rectangle. The image generation unit 367 generates the trimmed partial image as a transmission image.

Next, the feature extraction unit 373 extracts the feature of the target vessel (step S180). In this example, the feature includes the entire length of the target vessel, the type of target vessel, the course of the target vessel, the speed of the target vessel, and the navigation state of the target vessel. The navigation state of the target vessel is any of a state in which the target vessel has stopped and a state in which the target vessel is moving. Meanwhile, the feature may be configured to include other information indicating the feature of the target vessel instead of some or all thereof, or may be configured to include other information indicating the feature of the target vessel in addition to some or all thereof. Here, the process of step S180 will be described.

The feature extraction unit 373 extracts the feature of the target vessel on the basis of the binarized image generated in step S160 and the transmission image generated by the image generation unit 367 using the machine learning algorithm. In this case, information in which the feature of a region representing the target vessel and the feature of the target vessel are associated with each other is stored (learned) in the feature extraction unit 373 in advance as a plurality of parameters. In this example, the feature of the region includes the length of the region in a longitudinal direction, the length of the region in a transverse direction, a direction in which the longitudinal direction of the region is directed, the shape of the region, and the area of the region. Meanwhile, the feature may be configured to include other information indicating the region instead of some or all thereof, or may be configured to include other information indicating the region in addition to some or all thereof.

That is, information in which the entire length of a vessel and a combination of the length of a region representing the target vessel in a longitudinal direction, the length of the region in a transverse direction, a direction in which the longitudinal direction of the region is directed, the shape of the region and the area of the region are associated with each other is stored in the feature extraction unit 373 in advance as a plurality of parameters. The feature extraction unit 373 extracts a candidate likely to be the entire length, as the entire length, from candidates for the entire length of the target vessel on the basis of the parameters stored in advance and the region representing the target vessel included in the binarized image.

In addition, information in which the type of vessel and a combination of the length of a region representing the target vessel in a longitudinal direction, the length of the region in a transverse direction, a direction in which the longitudinal direction of the region is directed, the shape of the region and the area of the region are associated with each other is stored in the feature extraction unit 373 in advance as a plurality of parameters. The feature extraction unit 373 extracts a candidate likely to be the type, as the type, from candidates for the type (category) of target vessel on the basis of the parameters stored in advance and the region representing the target vessel included in the binarized image.

In addition, information in which the course of a vessel and a combination of the length of a region representing the target vessel in a longitudinal direction, the length of the region in a transverse direction, a direction in which the longitudinal direction of the region is directed, the shape of the region and the area of the region are associated with each other is stored in the feature extraction unit 373 in advance as a plurality of parameters. The feature extraction unit 373 extracts a candidate likely to be the course, as the course, from candidates for the course of the target vessel on the basis of the parameters stored in advance and the region representing the target vessel included in the binarized image.

In addition, information in which the speed of a vessel and a combination of the length of a region representing the target vessel in a longitudinal direction, the length of the region in a transverse direction, a direction in which the longitudinal direction of the region is directed, the shape of the region, the area of the region, and a wake if there is the wake outside of the region are associated with each other is stored in the feature extraction unit 373 in advance as a plurality of parameters. The feature extraction unit 373 extracts a candidate likely to be the speed, as the speed, from candidates for the speed of the target vessel on the basis of the parameters stored in advance and the region representing the target vessel included in the binarized image.

In addition, information in which the navigation state of a vessel and a combination of the length of a region representing the target vessel in a longitudinal direction, the length of the region in a transverse direction, a direction in which the longitudinal direction of the region is directed, the shape of the region, the area of the region, and a wake if there is the wake outside of the region are associated with each other is stored in the feature extraction unit 373 in advance as a plurality of parameters. The feature extraction unit 373 extracts a candidate likely to be the navigation state, as the navigation state, from candidates for the navigation state of the target vessel on the basis of the parameters stored in advance and the region representing the target vessel included in the binarized image.

Here, the machine learning algorithm used in step S180 by the feature extraction unit 373 may be any known algorithm (including deep learning), or may be an algorithm which can be developed in the future. For this reason, the machine learning algorithm will not be described in more detail. Meanwhile, the feature extraction unit 373 may be configured to extract the feature of the target vessel from the image generated in step S150 (that is, the image before the binarization filter is applied in step S160 or the image in which the standard deviation filter is applied) using the machine learning algorithm.

Next, the transmission data generation unit 375 generates transmission data (step S200). Specifically, in a case where an AIS signal is received in step S190, the transmission data generation unit 375 generates information including vessel identification information of the target vessel, vessel position information of the target vessel, a transmission image, vessel feature information of the target vessel, and AIS information as the transmission data. The vessel identification information is information for identifying the target vessel. Meanwhile, the vessel identification information may be any information in a case where each of one or more vessels detected in step S160 can be identified. The vessel position information is information indicating the position of the target vessel, that is, the position calculated in step S170. The transmission image is a transmission image generated in step S175. The vessel feature information is information indicating the feature of the target vessel, that is, each feature detected in step S180. The AIS information is AIS information stored in the storage unit 32 in step S190. In addition, in a case where the AIS signal is not received in step S190, the transmission data generation unit 375 generates information including the vessel identification information, the vessel position information, the transmission image, the vessel feature information, and information indicating that the AIS signal has not been received in step S190 as the transmission data.

Meanwhile, in a case where the AIS signal is received in step S190, the transmission data generation unit 375 may be configured to perform collation (matching) of the vessel feature information of the target vessel with the AIS information indicated by the AIS signal. In this case, the transmission data generation unit 375 specifies information coinciding with any of a plurality of pieces of information indicated by the AIS information among a plurality of pieces of information indicated by the vessel feature information. In addition, the transmission data generation unit 375 specifies information coinciding with none of the plurality of pieces of information indicated by the AIS information among the plurality of pieces of information indicated by the vessel feature information. In step S200, the transmission data generation unit 375 generates information including these pieces of specified information, the vessel identification information of the target vessel, the vessel position information of the target vessel, the transmission image, the vessel feature information of the target vessel, and the AIS information as the transmission data.

Next, the transmission data generation unit 375 stores the transmission data generated in step S200 in the storage unit 32 (step S210).

In this manner, the flying body 2 can generate transmission data for each of one or more vessels detected in step S160 by repeatedly performing the processes of steps S167 to S210, and store the generated transmission data in the storage unit 32.

After the repetitive processing of steps S167 to S210 is performed, the communication control unit 361 outputs each piece of transmission data stored in the storage unit 32 in step S210 to the communication antenna unit 22, causes the communication antenna unit 22 to transmit radio waves according to the transmission data toward the reception device 4 (step S220), and ends the process. Thereby, the flying body 2 can make, for example, the amount of data to be transmitted to the reception device 4 smaller than the amount of the observation data, and shorten a time required to provide information indicating that a vessel that is an example of the detection target is detected to a user.

Meanwhile, in step S220, the communication control unit 361 may be configured to output a portion of the transmission data stored in the storage unit 32 to the communication antenna unit 22, and to cause the communication antenna unit 22 to transmit radio waves according to the transmission data toward the reception device 4. In addition, the communication control unit 361 may be configured to output the transmission data generated by the transmission data generation unit 375 in step S200 to the communication antenna unit 22, and to cause the communication antenna unit 22 to transmit radio waves according to the transmission data toward reception device 4.

In addition, some or all of the detection-target detection unit 369, the position calculation unit 371 and the feature extraction unit 373 described above may be configured as an integrated functional unit. In a case where the detection-target detection unit 369 and the position calculation unit 371 are an integrated functional unit, the detection-target detection unit 369 integrated with the position calculation unit 371 detects one or more vessels in step S160, and calculates (detects) the position of each of the detected vessels. In addition, in a case where the detection-target detection unit 369 and the feature extraction unit 373 are an integrated functional unit, the detection-target detection unit 369 integrated with the feature extraction unit 373 detects one or more vessels in step S160, and extracts the feature of each of the detected vessels. In addition, in a case where the detection-target detection unit 369, the position calculation unit 371 and the feature extraction unit 373 are an integrated functional unit, the detection-target detection unit 369 integrated with the position calculation unit 371 and the feature extraction unit 373 detects one or more vessels in step S160, calculates (detects) the position of each of the detected vessels, and further extracts the feature of each of the detected vessels. In addition, in the flow chart shown in FIG. 4, the processes of steps S175 to S190 may be performed in parallel to each other, or may be performed in an order different from the order shown in FIG. 4.

Meanwhile, in the above embodiment, a detection process of performing feature extraction (S180) after vessel detection (S160) is shown, but the vessel detection may be performed, for example, as part of the feature extraction without being limited to the above aspect (the vessel detection and the feature detection may be performed at the same timing). That is, image generation (S150) in FIG. 4 may be performed, and then features (such as whether being a vessel, length (the entire length of a vessel), traveling direction (the navigation direction of a vessel), or type (the type of a vessel)) may be extracted.

As described above, the flying body 2 according to the present embodiment generates the observation data on the basis of radio waves received by a radar (the synthetic aperture radar unit 21 in this example), generates an image representing a monitoring space (an observation target in this example) on the basis of the generated observation data, and detects a detection target (a vessel in this example) on the basis of the generated image. Thereby, the flying body 2 can make the amount of data to be transmitted to a target to which data is transmitted (the reception device 4 in this example) smaller than the amount of the observation data, and notify a user earlier that a desired detection target has been detected.

In addition, the flying body 2 detects a candidate likely to be a detection target, as a detection target, from candidates for the detection target in a monitoring space on the basis of a plurality of parameters stored in advance. Thereby, the flying body 2 can notify a user earlier that a desired detection target has been detected on the basis of the plurality of parameters stored in advance.

In addition, the flying body 2 calculates the position of the detected detection target, and generates position information indicating the calculated position. Thereby, the flying body 2 can notify a user more rapidly of the detection of a desired detection target and the position of the detection target.

In addition, the flying body 2 extracts the feature of the detected detection target. Thereby, the flying body 2 can notify a user earlier of the detection of a desired detection target and the feature of the detection target.

Modified Example 1 of Embodiment

Hereinafter, modified example 1 of the embodiment will be described with reference to FIGS. 6 and 7. Meanwhile, in modified example 1 of the embodiment, the same components as those in the embodiment are denoted by the same reference numerals and signs, and thus the description thereof will not be given. In modified example 1, the control device 3 detects one or more vessels from the observation data without generating an image representing the region D. Specifically, the control device 3 executes processing of a flow chart shown in FIG. 6 instead of the processing of the flow chart shown in FIG. 4. In addition, in modified example 1, similarly to the embodiment, a case in which the detection target is a vessel will be described as an example. In addition, in modified example 1, a case in which the flying body 2 observes a region D2 instead of observing the region D will be described. The region D2 is a region including only a sea area (that is, not including the aforementioned land area) in a region included in the surface of the earth ET.

Figure 6:
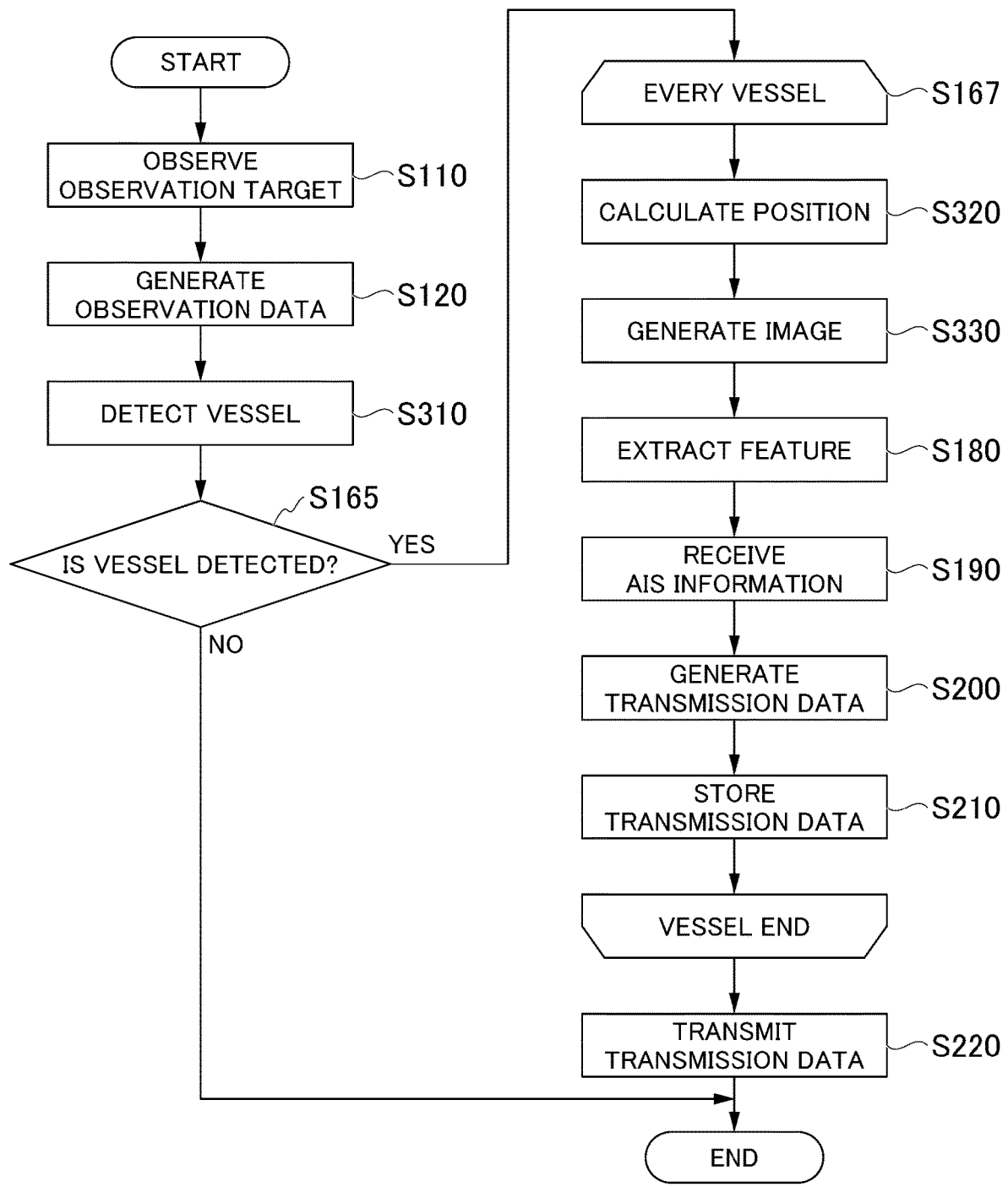
FIG. 6 is a flow chart illustrating another example of a flow of processes in which the control device 3 detects a vessel included in a region D2 on the basis of observation data.

FIG. 6 is a flow chart illustrating another example of a flow of processes in which the control device 3 detects a vessel in the region D2 on the basis of the observation data. Meanwhile, processes of steps S110 to S120, processes of steps S165 to S167, processes of steps S180 to S210, and a process of step S220 which are shown in FIG. 6 are the same as the processes of steps S110 to S120, the processes of steps S165 to S167, the processes of steps S180 to S210, and the processes of step S220 which are shown in FIG. 4, respectively, and thus the description thereof will not be given.

After the process of step S120 shown in FIG. 6 is performed, the detection-target detection unit 369 detects one or more vessels in the region D2 on the basis of the observation data generated in step S120 (step S310). Here, the process of step S310 will be described.

The detection-target detection unit 369 performs pulse compression in a range direction on the observation data generated in step S120 shown in FIG. 6 on the basis of a transmission chirp signal. In the following description, the observation data on which the pulse compression (range compression) is performed is referred to as compressed data for convenience of description.

Figure 7:
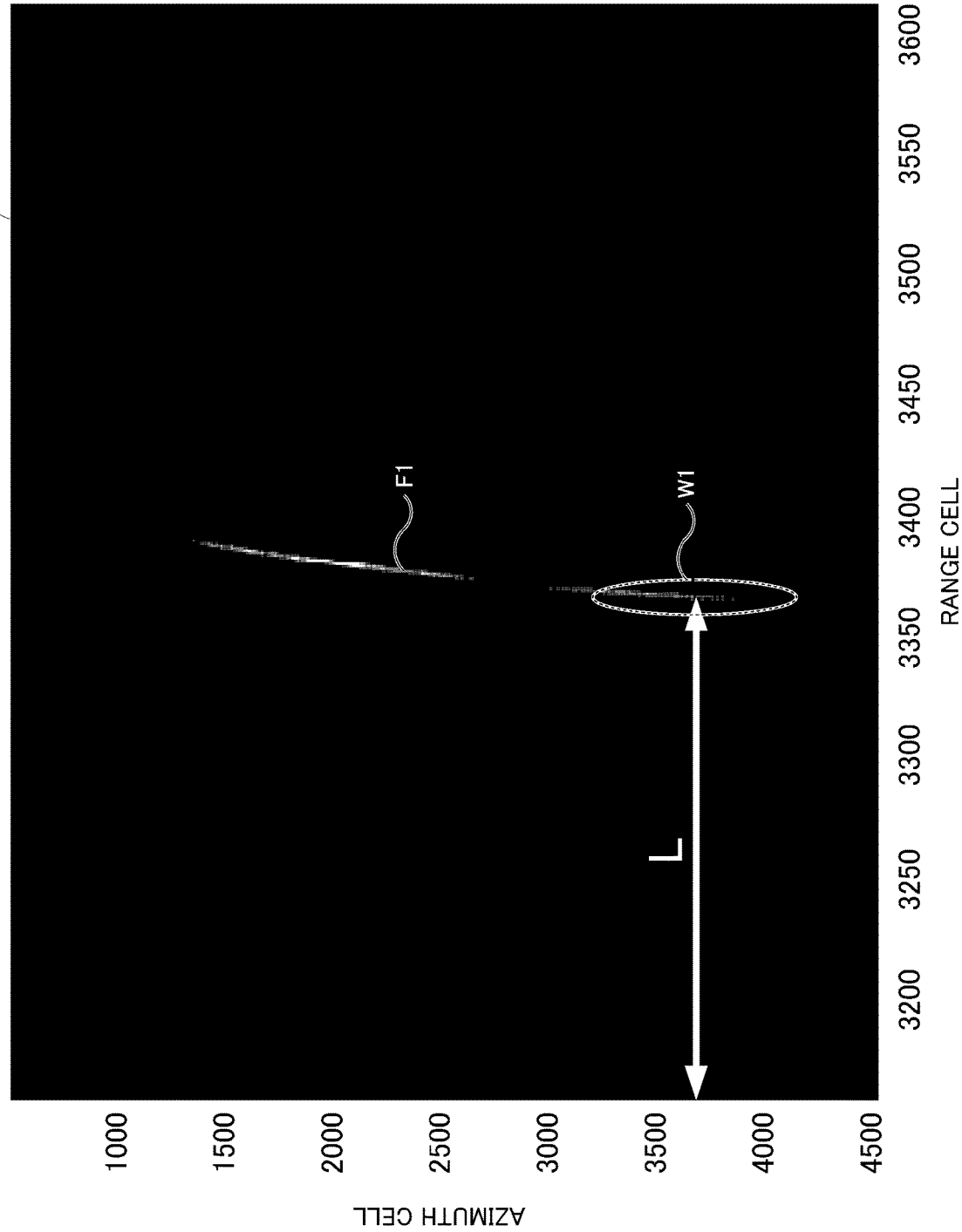
FIG. 7 is a diagram illustrating an example of a compressed data image in a case where one vessel is included in the region D2.

Here, in a case where one or more vessels is included in the region D2, one or more vessel regions which are regions corresponding to the vessels, that is, arc-shaped regions as shown in FIG. 7 appear in a compressed data image obtained by plotting the intensity of radio waves included in the compressed data in a graph in which the horizontal axis is set to a range cell number and the vertical axis is set to an azimuth cell number, wherein the compressed data image is constituted by a plurality of cells.

This arc-shaped region is a region representing range curvature included in the compressed data. Here, the range cell number (described as a range cell in FIG. 7) is the number of cells in the horizontal axis of the compressed data image, and is a numerical value capable of being converted into range distance. In addition, the azimuth cell number (described as an azimuth cell in FIG. 7) is the number of cells in the vertical axis of the compressed data image, and is a numerical value of being converted into time. FIG. 7 is a diagram illustrating an example of a compressed data image in a case where one vessel is included in the region D2. An image P2 shown in FIG. 7 is an example of a compressed data image. The luminance value of a pixel constituting the image P2 represents the intensity. The luminance value increases as the intensity becomes stronger. A region F1 shown in FIG. 7 is an example of a vessel region corresponding to the one vessel. In addition, in the example shown in FIG. 7, the luminance value of a plurality of pixels constituting the region F1 is a luminance value equal to or greater than a second predetermined luminance value. The vessel region has a partial region substantially parallel to the vertical axis within the compressed data image. In the example shown in FIG. 7, the partial region is a partial region of the region F1, and is a partial region shown by a region W1 in the image P2.

The detection-target detection unit 369 can detects a vessel region by detecting such a partial region from the compressed data.

Specifically, the detection-target detection unit 369 selects one or more range curvatures included in the compressed data one by one. The detection-target detection unit 369 calculates a total intensity that is a total of intensities of radio waves in each cell constituting a selected range curvature (for example, integrates the intensity and calculates the total value). The detection-target detection unit 369 specifies range curvature corresponding to the total intensity equal to or greater than a predetermined intensity among total intensities calculated for each range curvature. The detection-target detection unit 369 detects each of one or more specified range curvatures as a vessel.

Meanwhile, in a case where a land area is included in the region D2, the detection-target detection unit 369 can perform the process of step S310 by using a method of applying a land area filter to the compressed data or the like. In addition, the detection-target detection unit 369 may be configured to detect a vessel region from the compressed data using the machine learning algorithm. In this case, information in which a plurality of pieces of compressed data having a vessel included therein, the position and shape of the vessel region in each of the pieces of compressed data, and the like are associated with each other, a plurality of pieces of compressed data in which a vessel is not included, and information indicating that a vessel is not included in each of the pieces of compressed data are stored (learned) in the detection-target detection unit 369 in advance as a plurality of parameters. The detection-target detection unit 369 detects a candidate likely to be a vessel region, as a vessel region, from candidates for the vessel region included in the compressed data generated in step S310 on the basis of a plurality of parameters stored in advance. Here, the algorithm may be any known algorithm (including deep learning), or may be an algorithm which can be developed in the future. For this reason, the machine learning algorithm will not be described in more detail.

After the target vessel is selected in step S167 shown in FIG. 6, the position calculation unit 371 calculates the position of the target vessel (step S320). Specifically, the position calculation unit 371 specifies a cell having a smallest range distance among cells constituting the range curvature specified as the target vessel in step S310. The position calculation unit 371 specifies one or more cells associated with intensity equal to or greater than a predetermined threshold among intensities of radio waves associated with the specified cell. The position calculation unit 371 calculates a latitude and longitude corresponding to a cell serving as a midpoint between a cell having a oldest reception time among one or more specified cells and a cell having a newest reception time as the position of the target vessel. In this case, the position calculation unit 371 acquires flying body position information indicating the position of the flying body 2 at each time and flying body posture information indicating the posture of the flying body 2 at each time, and calculates a latitude and longitude corresponding to the cell as the position of the target vessel on the basis of the flying body position information and the flying body posture information which are acquired. Meanwhile, the position calculation unit 371 may be configured to specify the position of the target vessel from the compressed data using the machine learning algorithm. In this case, information in which a plurality of pieces of compressed data having a vessel included therein, the position and shape of the vessel in each of the pieces of compressed data, and the like are associated with each other, a plurality of pieces of compressed data in which a vessel is not included, and information indicating that a vessel is not included in each of the pieces of compressed data are stored (learned) in the position calculation unit 371 in advance as a plurality of parameters. The position calculation unit 371 specifies a candidate likely to be the position of the vessel, as the position of the vessel, from candidates for the position of the vessel included in the compressed data generated in step S310 on the basis of a plurality of parameters stored in advance. Here, the algorithm may be any known algorithm (including deep learning), or may be an algorithm which can be developed in the future. For this reason, the machine learning algorithm will not be described in more detail.

Next, the image generation unit 367 generates an image representing a region of a predetermined shape centering on the position of the target vessel, as a transmission image, on the basis of the observation data generated in step S120 and the position of the target vessel calculated in step S320 (step S330). Meanwhile, in step S330, the image generation unit 367 may be configured to generate the transmission image on the basis of the compressed data generated in step S310 instead of the observation data. A processing method of generating the transmission image on the basis of the observation data or the compressed data in step S330 may be a known method, or may be a method which can be developed in the future. For this reason, hereinafter, the processing method will not be described in more detail.

As described above, the flying body 2 according to the modified example 1 of the embodiment generates the observation data on the basis of radio waves received by a radar (the synthetic aperture radar unit 21 in this example), performs range compression on the generated observation data, and detects a detection target (a vessel in this example) on the basis of a signal on which range compression is performed. Thereby, the flying body 2 can shorten a time required for generating an image representing the region D2, and notify a user earlier that the detection target has been detected.

Modified Example 2 of Embodiment

Hereinafter, modified example 2 of the embodiment will be described with reference to FIG. 8. Meanwhile, in modified example 2 of the embodiment, the same components as those in the embodiment are denoted by the same reference numerals and signs, and thus the description thereof will not be given. In modified example 2, in a same manner with the embodiment, a case in which the detection target is a vessel will be described as an example. In addition, in modified example 2, in a same manner with modified example 1 of the embodiment, a case in which the flying body 2 observes the region D2 will be described. In addition, in modified example 2, the control device 3 detects the feature of each of one or more vessels in the region D2 from the observation data without generating an image representing the region D2. Specifically, the control device 3 executes processing of a flow chart shown in FIG. 8 instead of the processing of the flow chart shown in FIG. 4.

Figure 8:
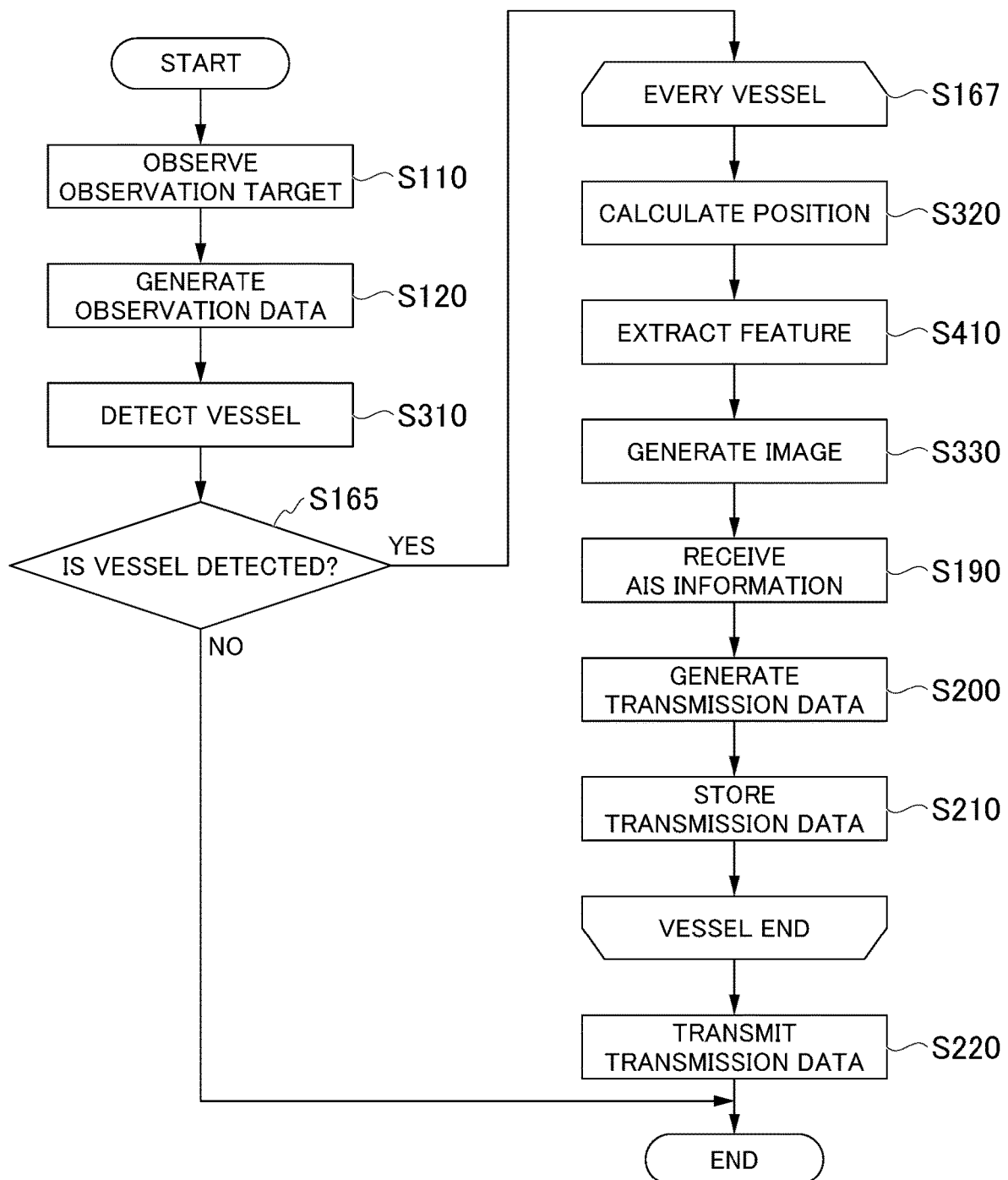
FIG. 8 is a flow chart illustrating still another example of a flow of processes in which the control device 3 detects a detection target included in the region D2 on the basis of observation data.

FIG. 8 is a flow chart illustrating still another example of a flow of processes in which the control device 3 detects a detection target in the region D2 on the basis of the observation data. Meanwhile, processes of steps S110 to S320, processes of steps S330 to S210, and a process of step S220 which are shown in FIG. 8 are the same as the processes of steps S110 to S320, the processes of steps S330 to S210, and the process of step S220 which are shown in FIG. 6, respectively, and thus the description thereof will not be given.

After the process of step S320 shown in FIG. 8 is performed, the feature extraction unit 373 extracts the feature of the target vessel on the basis of the compressed data generated in step S310 (step S410). Specifically, the feature extraction unit 373 extracts the feature of the target vessel from the compressed data using the machine learning algorithm. In this case, information in which the feature of a vessel region representing the target vessel and the feature of the target vessel are associated with each other is stored (learned) in the feature extraction unit 373 in advance as a plurality of parameters. The feature of the vessel region includes, for example, the width of the vessel region included in the compressed data in a longitude direction, the shape of the vessel region, and the area of the vessel region. Meanwhile, the feature may be configured to include other information indicating the vessel region instead of some or all thereof, or may be configured to include other information indicating the vessel region in addition to some or all thereof.

That is, information in which the entire length of a vessel and a combination of the width of the vessel region included in the compressed data in a longitude direction, the shape of the vessel region, and the area of the vessel region are associated with each other is stored in the feature extraction unit 373 in advance as a plurality of parameters. The feature extraction unit 373 extracts a candidate likely to be the entire length, as the entire length, from candidates for the entire length of the target vessel on the basis of the parameters stored in advance and the vessel region representing the target vessel included in the compressed data generated in step S310.

In addition, information in which the type of vessel and a combination of the width of the vessel region included in the compressed data in a longitude direction, the shape of the vessel region, and the area of the vessel region are associated with each other is stored in the feature extraction unit 373 in advance as a plurality of parameters. The feature extraction unit 373 extracts a candidate likely to be the type, as the type, from candidates for the type of target vessel on the basis of the parameters stored in advance and the vessel region representing the target vessel included in the compressed data generated in step S310.

In addition, information in which the course of a vessel and a combination of the width of the vessel region included in the compressed data in a longitude direction, the shape of the vessel region, and the area of the vessel region are associated with each other is stored in the feature extraction unit 373 in advance as a plurality of parameters. The feature extraction unit 373 extracts a candidate likely to be the course, as the course, from candidates for the course of the target vessel on the basis of the parameters stored in advance and the vessel region representing the target vessel included in the compressed data generated in step S310.

In addition, information in which the speed of a vessel and a combination of the width of the vessel region included in the compressed data in a longitude direction, the shape of the vessel region, and the area of the vessel region are associated with each other is stored in the feature extraction unit 373 in advance as a plurality of parameters. The feature extraction unit 373 extracts a candidate likely to be the speed, as the speed from candidates for the speed of the target vessel on the basis of the parameters stored in advance and the vessel region representing the target vessel included in the compressed data generated in step S310.

In addition, information in which the navigation state of a vessel and a combination of the width of the vessel region included in the compressed data in a longitude direction, the shape of the vessel region, and the area of the vessel region are associated with each other is stored in the feature extraction unit 373 in advance as a plurality of parameters. The feature extraction unit 373 extracts a candidate likely to be the navigation state, as the navigation state, from candidates for the navigation state of the target vessel on the basis of the parameters stored in advance and the vessel region representing the target vessel included in the compressed data generated in step S310.

Here, the machine learning algorithm used in step S410 by the feature extraction unit 373 may be any known algorithm (including deep learning), or may be an algorithm which can be developed in the future. For this reason, the machine learning algorithm will not be described in more detail.

As described above, the flying body 2 according to modified example 2 of the embodiment extracts the feature of each of one or more vessels from the observation data without generating an image representing the region D2. As a result, the flying body 2 can shorten a time required for generating the image, and notify a user earlier of vessel feature information indicating the detected feature of a vessel.

Modified Example 3 of Embodiment

Hereinafter, modified example 3 of the embodiment will be described with reference to FIG. 9. Meanwhile, in modified example 3 of the embodiment, the same components as those in the embodiment are denoted by the same reference numerals and signs, and thus the description thereof will not be given. In modified example 3, in a same manner with modified example 1 of the embodiment, a case in which the flying body 2 observes the region D will be described. In addition, in modified example 3, a case in which the detection target is a crustal movement will be described. Specifically, the control device 3 detects an uplift or sedimentation occurring in at least a portion of a land area included in the region D as a crustal movement. In order to detect the crustal movement, the control device 3 executes processing of a flow chart shown in FIG. 9 instead of the processing of the flow chart shown in FIG. 4. Meanwhile, the detection target may be configured to include other objects or phenomena in addition to the crustal movement.

Figure 9:
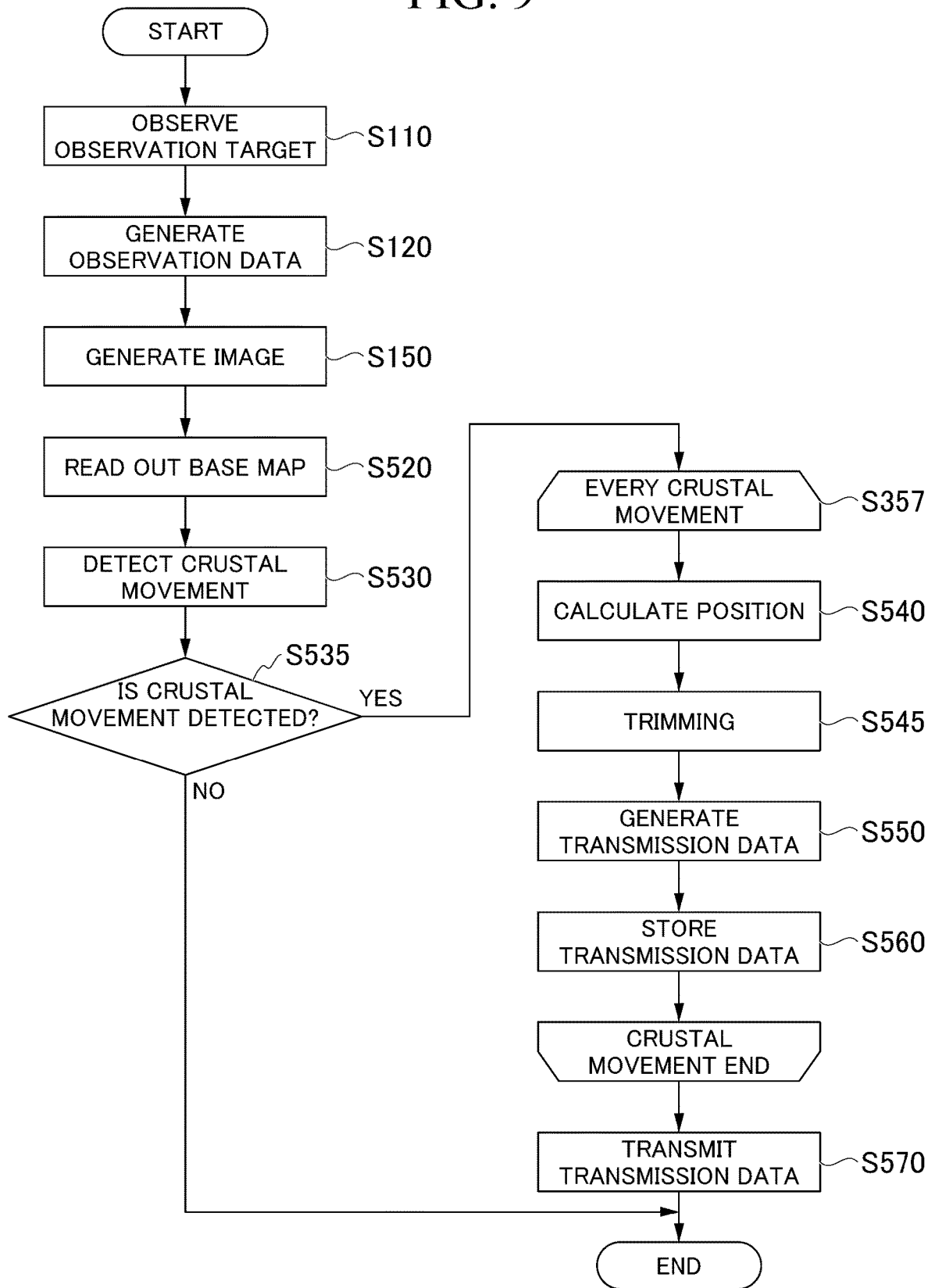
FIG. 9 is a flow chart illustrating an example of a flow of processes in which the control device 3 detects a crustal movement occurring in at least a portion of a land area included in the region D on the basis of observation data.

FIG. 9 is a flow chart illustrating an example of a flow of processes in which the control device 3 detects a crustal movement occurring in at least a portion of a land area included in the region D on the basis of the observation data. Meanwhile, each of processes of steps S110 to S150 shown in FIG. 9 is the same as each of the processes of steps S110 to S150 shown in FIG. 4, and thus the description thereof will not be given.

After the process of step S150 shown in FIG. 9 is performed, the detection-target detection unit 369 reads out a base map stored in the storage unit 32 in advance from the storage unit 32 (step S520). In this example, the base map is an image representing the region D generated in step S150 executed in the past by the control device 3.

Next, the detection-target detection unit 369 detects a crustal movement occurring in at least a portion of a land area included in the region D on the basis of the image representing the region D generated in step S150 shown in FIG. 9 and the base map which is read out in step S520 (step S530). Here, a process of step S530 will be described. In the following description, for convenience of description, each of a plurality of pixels constituting the image is referred to as a first pixel, and each of a plurality of pixels constituting a base map is referred to as a second pixel.

The detection-target detection unit 369 selects the second pixel corresponding to the first pixel for each of a plurality of first pixels constituting an image representing the region D generated in step S150 shown in FIG. 9. The second pixel is a pixel representing the same backscattering body as the position of the backscattering body represented by the first pixel, and is a pixel constituting a base map. The detection-target detection unit 369 calculates a difference between a phase associated with a certain first pixel and a phase associated with the second pixel. A component obtained by removing an unnecessary phase component from the calculated difference is extracted as a phase component caused by the crustal movement. In a case where the extracted phase component is equal to or greater than a predetermined value, the detection-target detection unit 369 specifies the first pixel as a third pixel. On the other hand, in a case where the calculated difference is less than the predetermined value, the detection-target detection unit 369 specifies the first pixel as a fourth pixel. Meanwhile, in the case, the detection-target detection unit 369 may be configured to do nothing. The detection-target detection unit 369 repeatedly performs a process from the selection of the second pixel to the specification of the third pixel or the fourth pixel with respect to each of all the first pixels.

The detection-target detection unit 369 specifies third pixels next to each other among one or more specified third pixels as one unity. The detection-target detection unit 369 excludes a unity in which the number of third pixels constituting a unity is less than a predetermined number, as noise, from one or more specified unities. The detection-target detection unit 369 detects each of one or more unities remaining without being excluded as the crustal movement.

After the process of step S530 is performed, the detection-target detection unit 369 determines whether the crustal movement has been detected in step S530 (step S535). In a case where the detection-target detection unit 369 determines that the crustal movement has not been detected in step S530 (step S535—NO), the control unit 36 ends the process. On the other hand, in a case where the detection-target detection unit 369 determines that the crustal movement has been detected in step S530 (step S535—YES), the position calculation unit 371, the image generation unit 367, the transmission data generation unit 375, and the communication control unit 361 each repeatedly perform the processes of steps S540 to S560 for every one or more crustal movements detected in step S530 (step S357). In the following description, the crustal movement selected in step S530 is referred to as a target crustal movement for convenience of description.

After the target crustal movement is selected in step S530, the position calculation unit 371 calculates the position of the target crustal movement (step S540). Specifically, the position calculation unit 371 calculates a predetermined position of a unity of the third pixel detected as the crustal movement in step S530 as the position of the target crustal movement. The predetermined position is, for example, the position of the center of figure (or centroid) of a region constituted by the unity. Meanwhile, the predetermined position may be other positions based on the region instead of the position of the center of figure of the region.

Next, the image generation unit 367 trims the image generated in step S150 on the basis of the position of the target crustal movement calculated in step S540 (step S545). Specifically, the image generation unit 367 trims (clips) a partial image representing a region of a predetermined shape centering on the position of the target crustal movement calculated in step S540 in a region included in the region D from the image. The predetermined shape is, for example, a predetermined distance-square rectangle. In addition, the predetermined shape is a rectangular region having a side parallel to the latitude direction and a side parallel to the longitude direction in the image. The predetermined distance is, for example, 500 meters. Meanwhile, the predetermined distance may be a distance smaller than 500 meters, or may be a distance greater than 500 meters. In addition, the predetermined shape may be other shapes such as a circle or an ellipse instead of the rectangle. The image generation unit 367 generates the trimmed partial image as a transmission image.

Next, the transmission data generation unit 375 generates transmission data (step S550). Specifically, the transmission data generation unit 375 generates information including crustal movement identification information, crustal movement position information, and a transmission image as the transmission data. The crustal movement identification information is information for identifying the target crustal movement. Meanwhile, the crustal movement identification information may be any information insofar as each of one or more crustal movements detected in step S530 can be identified. The crustal movement position information is information indicating the position of the target crustal movement, that is, the position calculated in step S540. The transmission image is a transmission image generated in step S545.

Next, the transmission data generation unit 375 stores the transmission data generated in step S550 in the storage unit 32 (step S560).

In this manner, the flying body 2 can generate the transmission data for each of one or more crustal movements detected in step S530 by repeatedly performing the processes of steps S357 to S560, and store the generated transmission data in the storage unit 32.

After the repetitive processing of steps S357 to S560 is performed, the communication control unit 361 outputs each piece of transmission data stored in the storage unit 32 in step S550 to the communication antenna unit 22, causes the communication antenna unit 22 to transmit radio waves according to the transmission data toward the reception device 4 (step S570), and ends the process. Thereby, the flying body 2 can make, for example, the amount of data to be transmitted to a target to which data is transmitted (the reception device 4 in this example) smaller than the amount of the observation data, and shorten a time required to provide information indicating that the crustal movement that is an example of the detection target is detected to a user.

Meanwhile, in step S570, the communication control unit 361 may be configured to output a portion of the transmission data stored in the storage unit 32 to the communication antenna unit 22, and to cause the communication antenna unit 22 to transmit radio waves according to the transmission data toward the reception device 4. In addition, the communication control unit 361 may be configured to output the transmission data generated by the transmission data generation unit 375 in step S550 to the communication antenna unit 22, and to cause the communication antenna unit 22 to transmit radio waves according to the transmission data toward reception device 4.

In addition, the flying body 2 may be applied to local disaster detection, monitoring of volcanic activity, infrastructure monitoring, or the like instead of being configured to be applied to the detection of such a crustal movement. In addition, the flying body 2 may be configured to detect the feature of the target crustal movement at arbitrary timing included in a period in which the processes of steps S357 to S545 shown in FIG. 9 are performed. In this case, the flying body 2 detects the feature using the machine learning algorithm. The flying body 2 generates transmission data including information indicating the feature in step S550.

As described above, the flying body 2 according to modified example 3 of the embodiment detects the crustal movement by comparing a base map with an image representing the generated region D. Thereby, the flying body 2 can notify a user earlier that the crustal movement has been detected, on the basis of the base map and the image representing the generated region D.

Meanwhile, the control device 3 described above may be configured to be mounted in other flying bodies such as an airplane instead of the flying body 2. In this case, functional units corresponding to the synthetic aperture radar unit 21 and the communication antenna unit 22, respectively, are mounted in the flying body. In addition, the detection-target detection unit 369 may be configured to obtain image similarity, coherence deterioration, or the like through coherence analysis, and to detect a local change of a ground surface in the region D instead of being configured to calculate a phase difference between the base map and the image representing the generated region D.

Hereinbefore, the embodiment of the present invention has been described in detail with the accompanying drawings, but specific configurations are not limited to this embodiment, and may be changed, substituted, deleted, and the like without departing from the scope of the present invention.

In addition, a program for realizing a function of any configuration unit in the device described above (for example, the flying body 2) may be recorded in a computer readable recording medium, and the program may be read and executed in a computer system. Meanwhile, the term "computer system" referred to here is assumed to include an operating system (OS) or hardware such as peripheral devices. In addition, the term "computer readable recording medium" refers to a portable medium such as a flexible disk, a magneto optic disc, a ROM, or a compact disk (CD)-ROM, and a storage device such as a hard disk built into a computer system.

Further, the term "computer readable recording medium" may also include a recording medium that holds a program for a certain period of time like a volatile memory (RAM) inside a computer system serving as a server or a client in a case where a program is transmitted through networks such as the Internet or communication lines such as a telephone line.

In addition, the above-mentioned program may be transmitted from a computer system having this program stored in a storage device or the like through a transmission medium or through transmitted waves in the transmission medium to other computer systems. Here, the "transmission medium" that transmits a program refers to a medium having a function of transmitting information like networks (communication networks) such as the Internet or communication channels (communication lines) such as a telephone line.

In addition, the above-mentioned program may realize a portion of the above-mentioned functions. Further, the above-mentioned program may be a so-called difference file (difference program) capable of realizing the above-mentioned functions by a combination with a program which is already recorded in a computer system.

INDUSTRIAL APPLICABILITY

According to the flying body and the program described above, when data is transmitted to a ground station side, it is possible to make the amount of data to be transmitted smaller than the amount of observation data. This makes it possible to notify a user earlier that a desired detection target has been detected.

REFERENCE SIGNS LIST

1 Satellite observation system
2 Flying body
3 Control device
4 Reception device
21 Synthetic aperture radar unit
22 Communication antenna unit
31 FPGA
32 Storage unit
34 Communication unit
36 Control unit
361 Communication control unit
363 Radar control unit
364 Observation data generation unit
365 Processing unit
367 Image generation unit
369 Detection-target detection unit
371 Position calculation unit
373 Feature extraction unit
375 Transmission data generation unit

The invention claimed is:
1. A flying body comprising:
a synthetic aperture radar; and
a field programmable gate array (FPGA) configured to:
generate observation data on the basis of only radio waves received by the synthetic aperture radar;
generate an image representing a monitoring space on the basis of the generated observation data; and
detect a detection target on the basis of the generated image, wherein
the monitoring space includes a sea area, and
the detection target includes a vessel in the sea area.
2. The flying body according to claim 1, wherein the FPGA detects the detection target through binarization of the generated image.
3. The flying body according to claim 1, wherein the FPGA detects a target estimated to be the detection target, as the detection target, from candidates for the detection target in the monitoring space on the basis of a plurality of parameters stored in advance.

4. The flying body according to claim 1, wherein
the FPGA trims a partial image representing a region of a predetermined shape centering on the position of the detection target from the generated image, and
generates the trimmed partial image as a transmission image.

5. The flying body according to claim 1, wherein the FPGA calculates a position of the detection target and generates position information indicating the calculated position.

6. The flying body according to claim 1, wherein the FPGA extracts a feature of the detection target.

7. A flying body comprising:
a synthetic aperture radar; and
a field programmable gate array (FPGA) configured to:
generate observation data on the basis of only radio waves received by the synthetic aperture radar;
perform range compression on the generated observation data; and
detect a detection target on the basis of a signal on which range compression is performed, wherein
the monitoring space includes a sea area, and
the detection target includes a vessel in the sea area.

8. A flying body comprising:
a synthetic aperture radar; and
a field programmable gate array (FPGA) configured to:
generate observation data on the basis of radio waves received by the synthetic aperture radar;
generate an image representing a monitoring space on the basis of the generated observation data; and
detect a detection target on the basis of the generated image, wherein
the FPGA detects the detection target by comparing a base map with the generated image, and
the detection target includes at least one of a crustal movement and a local change of a ground surface in the monitoring space.

* * * * *